United States Patent
Uchiyama et al.

(10) Patent No.: US 6,920,858 B2
(45) Date of Patent: Jul. 26, 2005

(54) AIR INTAKE STRUCTURE OF INTERNAL COMBUSTION ENGINE

(75) Inventors: Shigeki Uchiyama, Yokohama (JP); Kenichi Sakuraba, Kanagawa (JP); Koji Yamashita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/959,579

(22) Filed: Oct. 7, 2004

(65) Prior Publication Data

US 2005/0076872 A1 Apr. 14, 2005

(30) Foreign Application Priority Data

Oct. 10, 2003 (JP) ........................................ 2003-351583

(51) Int. Cl.[7] ............................................. F02M 35/10
(52) U.S. Cl. ............................. 123/184.42; 123/184.47
(58) Field of Search ...................... 123/184.42, 184.47, 123/184.21, 184.38, 184.53

(56) References Cited

U.S. PATENT DOCUMENTS

| | | | | |
|---|---|---|---|---|
| 5,537,965 A | * | 7/1996 | Topfer et al. | ........... 123/184.42 |
| 5,603,295 A | * | 2/1997 | Topfer et al. | ........... 123/184.42 |
| 5,623,900 A | * | 4/1997 | Topfer et al. | ........... 123/184.42 |
| 6,425,363 B1 | * | 7/2002 | Lieske et al. | ........... 123/184.21 |

FOREIGN PATENT DOCUMENTS

| | | |
|---|---|---|
| JP | 6-173798 A | 6/1994 |
| JP | 8-105359 A | 4/1996 |
| JP | 8-334069 A | 12/1996 |

OTHER PUBLICATIONS

U.S. Appl. No. 10/959,583, filed Oct. 7, 2004, Uchiyama et al.

* cited by examiner

*Primary Examiner*—Mahmoud Gimie
(74) *Attorney, Agent, or Firm*—Foley & Lardner LLP (57) ABSTRACT

An air intake structure of a multiple cylinder internal combustion engine. The air intake structure includes an intake air collector having first and second end sides which are longitudinally opposite to each other. An intake air inducting pipe is connected to the intake air collector. A plurality of branch pipes are connected to the intake air collector. Each branch pipe is connected through a junction section of the branch pipe to the intake air collector. The intake air inducting pipe has an opening section which is located between a first branch pipe located at the first end side of the intake air collector and a second branch pipe located adjacent to the first branch pipe in a longitudinal direction of the intake air collector. The opening section has an axis directed to a third branch pipe located at the second end side of the intake air collector.

5 Claims, 7 Drawing Sheets

NEAR EQUAL LENGTHS BUT
NOT COMPLETELY EQUAL LENGTHS

FIG.6B

PROVIDING SIMILAR EFFECT TO
THAT OF EQUAL LENGTHS

UNEQUAL LENGTHS IN ALL BRANCH PIPES

FIG.9B

NOT UNIFORM IN ALL BRANCH PIPES

EQUAL LENGTHS IN ALL BRANCH PIPES

FIG.11B

UNIFORM IN ALL BRANCH PIPES

SIMILAR LENGTHS IN ALL BRANCH PIPES

FIG.13B

CLASSIFIED INTO TWO KINDS OF VALUES SO THAT DEGREE COMPONENTS ARE ONE-SIDED, THOUGH ALL BRANCH PIPES HAVE SIMILAR LENGTHS

FIG.14

AIR INTAKE STRUCTURE OF INTERNAL COMBUSTION ENGINE

BACKGROUND OF THE INVENTION

This invention relates to improvements in an air intake structure of an internal combustion engine.

In internal combustion engines having a plurality of cylinders, in general, the more uniform the lengths of air induction pipes for respective cylinders are, the smaller the variation in volumetric efficiency of intake air among cylinders become, thereby achieving improvement in power output, reduction of vibration and the like while making uniform the waveform (height and phase) of noise generated by air suction of each cylinder so that the tone of noise becomes clear.

In this regard, Japanese Patent Provisional Publication No. 8-105359, discloses a technique in which a surge tank is disposed one-sided to upstream side air induction pipe placed in one end side in a cylinder row direction of an engine body, and the upstream ends of respective branch pipes of an intake manifold are located closer to the engine body as they come to the downstream side from the upstream side in intake air flow within the surge tank.

BRIEF SUMMARY OF THE INVENTION

In this configuration disclosed in the above publication, on the assumption that the capacity of the surge tank is sufficiently large, the upstream end of each branch pipe is considered as an open end from the viewpoint of power output of internal combustion engine. Therefore, it is considered that intake air is equally divided into the cylinders. However, the substantial length of an intake air passage for each cylinder includes a length from the upstream end of the branch to the one end wall of the surge tank connected with a throttle chamber. Therefore, there arise problems that it is difficult to make uniform the waveforms (height and phase) of intake air noises generated by air suction of respective cylinders and to make clear the tone of intake air noise from each cylinder.

It is an object of the present invention to provide an improved air intake structure of an internal combustion engine, which can effectively overcome the drawbacks encountered in conventional air intake structure.

Another object of the present invention is to provide an improved air intake structure of an internal combustion engine, by which intake the waveforms of intake air noises generated under air suctions of respective cylinders of the engine are made uniform while the tone of intake air noise from each cylinder can be made clear.

According to the present invention, an air intake structure of an internal combustion engine, comprises an intake air collector having first and second end sides which are longitudinally opposite to each other. An intake air inducting pipe is connected to the intake air collector. A plurality of branch pipes are connected to the intake air collector and communicated respectively with intake air entrances of cylinders of the engine. Each branch pipe is connected through a junction section of the branch pipe to the intake air collector. The junction sections of the branch pipes are arranged or aligned along a longitudinal direction of the intake air collector. In this arrangement, the intake air inducting pipe having an opening section serving as the junction section. The opening section is located between a first branch pipe located at the first end side of the intake air collector and a second branch pipe located adjacent to the first branch pipe in a longitudinal direction of the intake air collector, and having an axis which is directed to a third branch pipe located at the second end side of the intake air collector.

BRIEF DESCRIPTION OF THE DRAWINGS

In the drawings, like reference numerals designate like elements and parts throughout all figures, in which.

DETAILED DESCRIPTION OF THE INVENTION

Referring now to FIGS. 1 to 4 of the drawings, an embodiment of an air intake structure of an internal combustion engine is illustrated including intake manifold 1. The internal combustion engine is an inline four-cylinder engine. Intake manifold 1 is made of plastic or the like. As shown in FIG. 1 to FIG. 4, intake manifold 1 includes intake air collector 2 which is elongate and extends along a row of cylinders of engine main body 8. Intake air inducting pipe 3 is connected with intake air collector 2. Four branch pipes 4a, 4b, 4c and 4d are connected with intake air collector 2. Through each branch pipe, intake air is supplied to each cylinder of the engine main body. More specifically, first, second, third, and fourth cylinders C1, C2, C3, C4 are supplied with intake air through branch pipes 4a, 4b, 4c and 4d, respectively.

Through intake air inducting pipe 3, intake air is inducted into intake air collector 2. Intake air inducting pipe 3 is connected with intake air collector 2 at a side surface opposite to a side surface at which branch pipes 4a to 4d are connected, and on one end side (or left side in FIG. 1) of intake air collector 2 in a longitudinal direction of the intake air collector.

Figure 1:
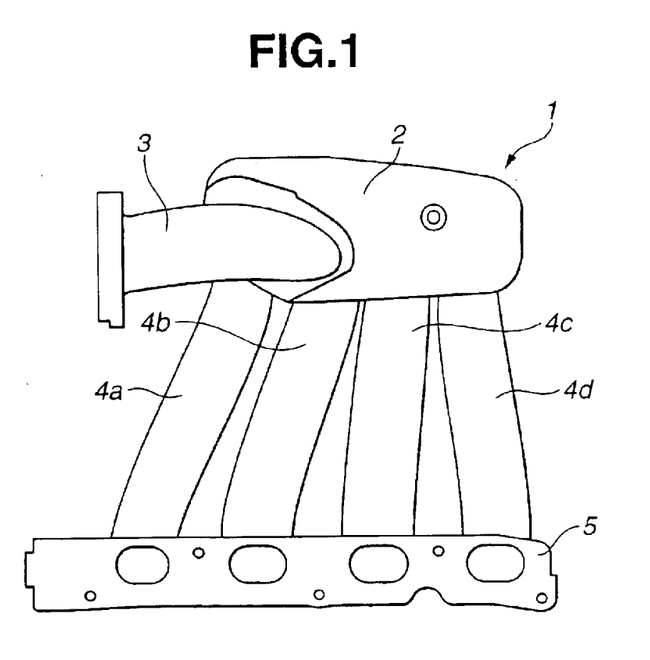
FIG. 1 is a front view of an embodiment of an air intake structure according to the present invention.
Figure 2:
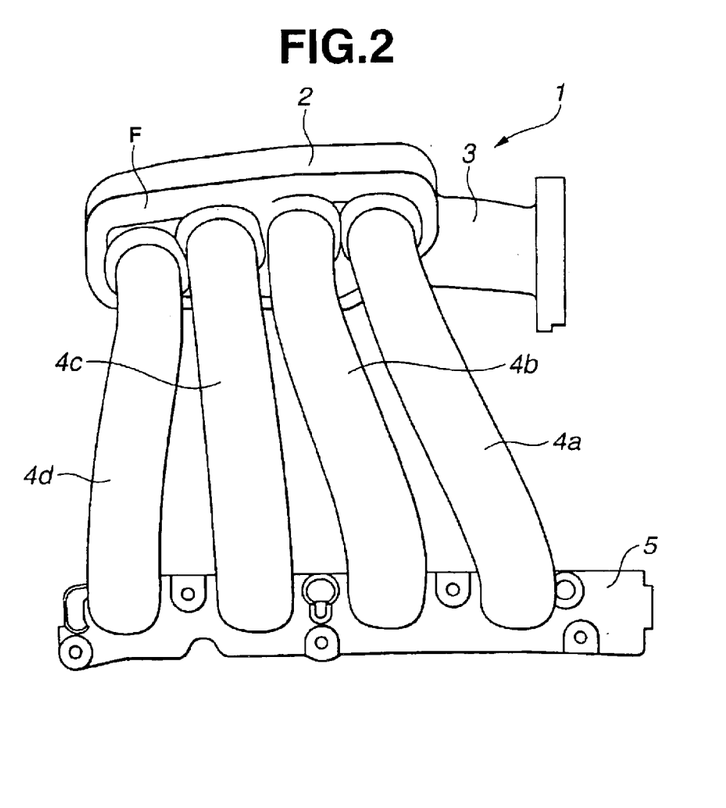
FIG. 2 is a rear view of the intake structure of FIG. 1.
Figure 3:
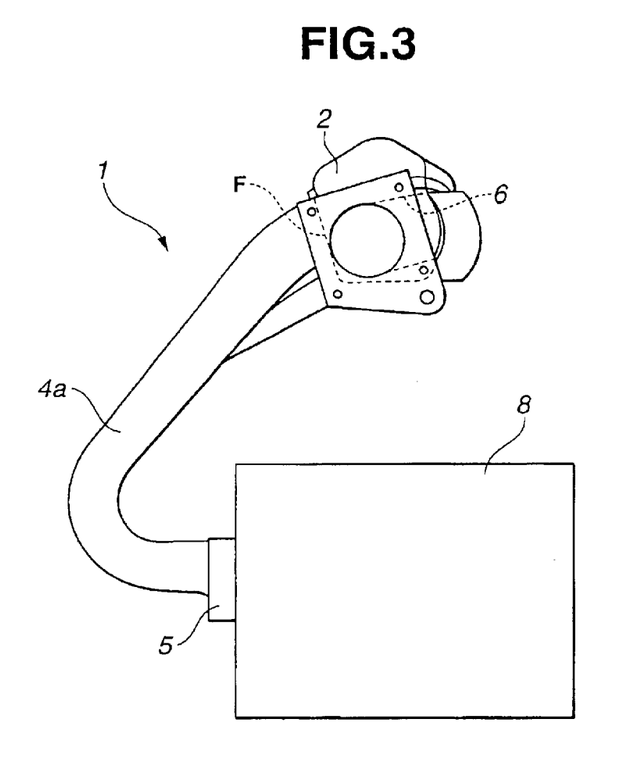
FIG. 3 is a left-side view of the air intake structure of FIG. 1.

Through each branch pipe 4a to 4d, intake air within intake air collector 2 is inducted to an intake air entrance (not shown) of the corresponding cylinder C1, C2, C3, C4. One end section of each branch pipe extends generally in the same direction to be connected with intake air collector 2. The side surface F at which each branch pipe 4a to 4d is connected as shown in FIG. 2 and FIG. 3 is formed extending generally along a vertical direction of engine main body 8 (i.e., generally along a vertical direction in FIG. 3). Each branch pipe 4a to 4d is formed to be generally U-shaped as a whole and extends from the intake air entrance opened on the side surface of engine main body 8 toward an upper side of engine main body 8. Therefore, intake air collector 2 is located above engine main body 8. The other end section of each branch pipe 4a to 4d is connected with each other by flange 5.

Figure 4:
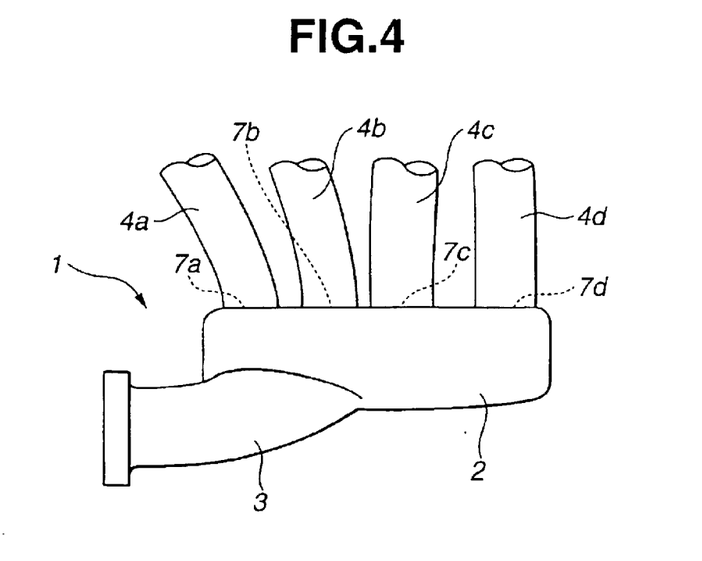
FIG. 4 is a schematic plan view of the air intake structure of FIG. 1.
Figure 5:
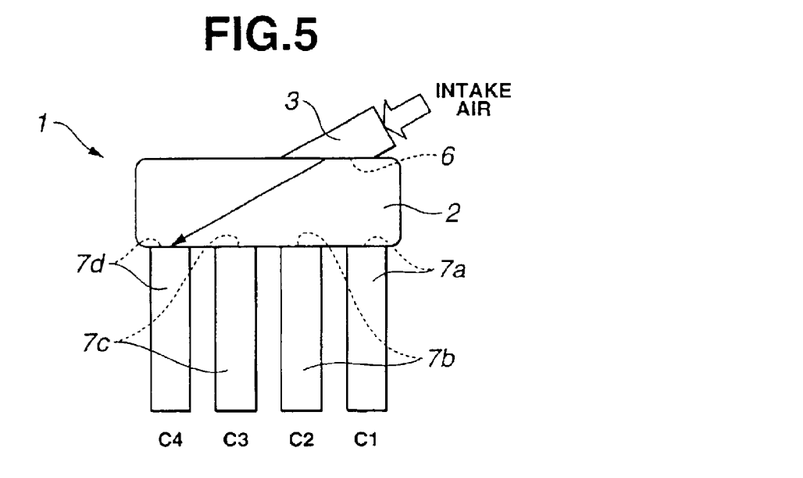
FIG. 5 is an explanatory view showing schematically the air intake structure of FIG. 1.

As shown in FIG. 4 and FIG. 5, intake air inducting pipe 3 has intake air inducting pipe opening section 6 at which intake air inducting pipe 3 and intake air collector 2 is connected each other. Intake air inducting pipe opening section 6 extends along the longitudinal direction of intake air collector 2. Intake air inducting pipe opening section 6 is also located between or bridges branch pipe 4a which is located on one end side of intake air collector 2 and branch pipe 4b which is located adjacent to branch pipe 4a, on a plane of FIGS. 1 and 2. More specifically, intake air inducting pipe opening section 6 is formed to be located between or bridge branch pipe opening 7a which is a junction (section) connecting branch pipe 4a with intake air collector 2 and branch pipe opening 7b which is the junction connecting branch pipe 4b with intake air collector 2, in the longitudinal direction of intake air collector 2. FIG. 5 is a schematic plan view showing a locational configuration including intake air inducting pipe 3, intake air collector 2 and each branch pipe 4a to 4d.

Furthermore, intake air inducting pipe opening section 6 has an axis (not shown) which is directed to branch pipe 4d which is nearly located on the other end side (or right side in FIG. 1) of intake air collector 2. More specifically, the axis of intake air inducting pipe opening section 6 is inclined to an axis (not shown) of branch pipe 4 as indicated by an arrow in FIG. 5, on a plane of FIG. 5. The axis of intake air inducting pipe opening section 6 is also formed to be directed to branch pipe opening section 7d which is a junction (section) connecting branch pipe 4d with intake air collector 2. Additionally, 7c denotes a branch pipe opening section which is a junction (section) connecting branch pipe 4c with intake air collector 2.

In such an intake manifold 1 of this embodiment, the substantial length of intake air passage becomes longer as the junction (section) between intake air collector 2 and the branch pipe is located far from intake air inducting pipe opening section 6 in the longitudinal direction of intake air collector 2. The "intake air passage" means a passage through which intake air flows, formed in the air intake structure. However, intake air inducting pipe 3 is connected with intake air collector 2 at a location between branch pipe 4a and branch pipe 4b in the longitudinal direction of intake air collector 2, so that it is possible to decrease a difference in substantial length of the intake air passage among respective cylinders.

The axis of intake air inducting pipe opening section 6 is directed to branch pipe 4d located the farthest from intake air inducting pipe opening section 6 in the longitudinal direction of intake air collector 2. Therefore, a bend of the intake air inducted from intake air inducting pipe opening section 6 to the branch pipe is increased as the branch pipe comes close to intake air inducting pipe opening section 6 in the longitudinal direction of intake air collector 2. A pressure loss (or bend loss) generated by the bend of intake air is relatively increased as branch pipe 4 comes close to intake air inducting pipe opening section 6.

The length from the junction between the branch pipe and intake air collector 2 to intake air inducting pipe opening section 6 become longer as the junction between branch pipe 4 and intake air collector 2 becomes far from intake air inducting pipe opening section 6. Accordingly, a pressure loss (or length loss) generated by the length of the intake air is relatively increased as the branch pipe is far from intake air inducting pipe opening section 6.

Figure 6A:
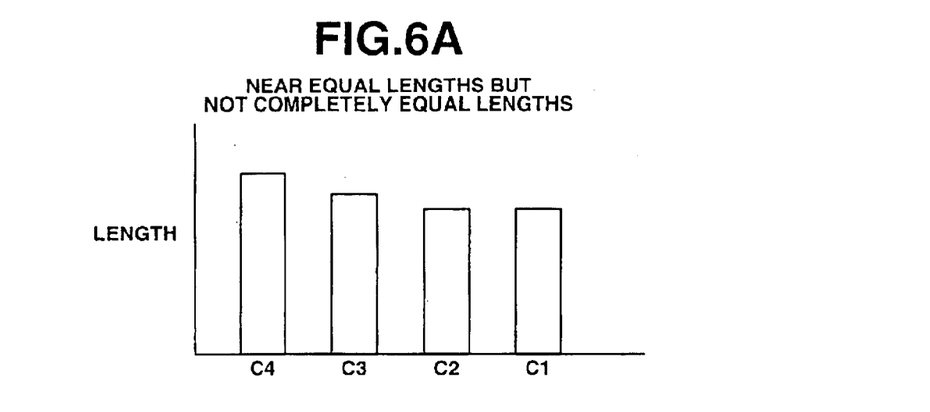
FIG. 6A is a graph showing a structural feature of the air intake structure of FIG. 1 in terms of length in air intake passage.
Figure 6B:
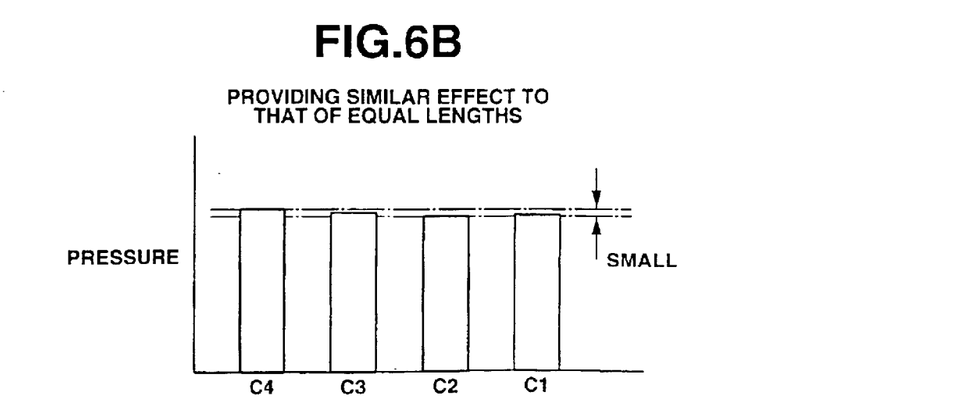
FIG. 6B is a graph showing an effect of the air intake structure of FIG. 1 in terms of pressure of air.
Figure 11A:
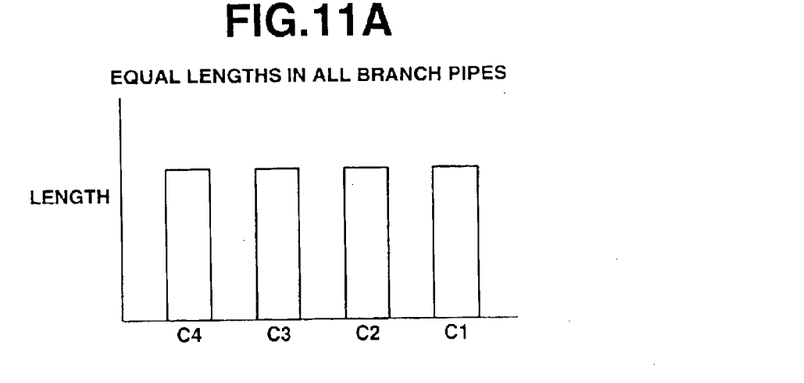
FIG. 11A is a graph showing a structural feature of the intake manifold A of FIG. 10, in terms of length in air intake passage.
Figure 11B:
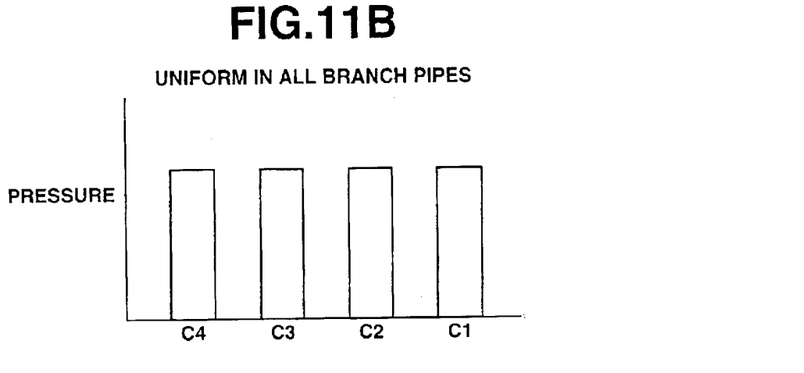
FIG. 11B is a graph showing an effect of the intake manifold A of FIG. 10, in terms of pressure of air.

That is to say, in intake manifold 1 of this embodiment, the substantial lengths of the intake air passages for the respective cylinders do not become equal as shown in FIG. 6A. However, peak values of pressure wave or peak values of air pressure generated by the respective cylinders delicately differ from each other, and differences in pressure peak value among the respective cylinders can be decreased under the influence of the bend loss and the length loss described above as shown in FIG. 6B. Therefore, this embodiment provides the almost same effect as that in a case (as shown in FIGS. 11A and 11B as discussed after) that the substantial lengths of the intake air passages for the respective cylinders are equal to each other so that intake air noise can become clear.

Figure 7:
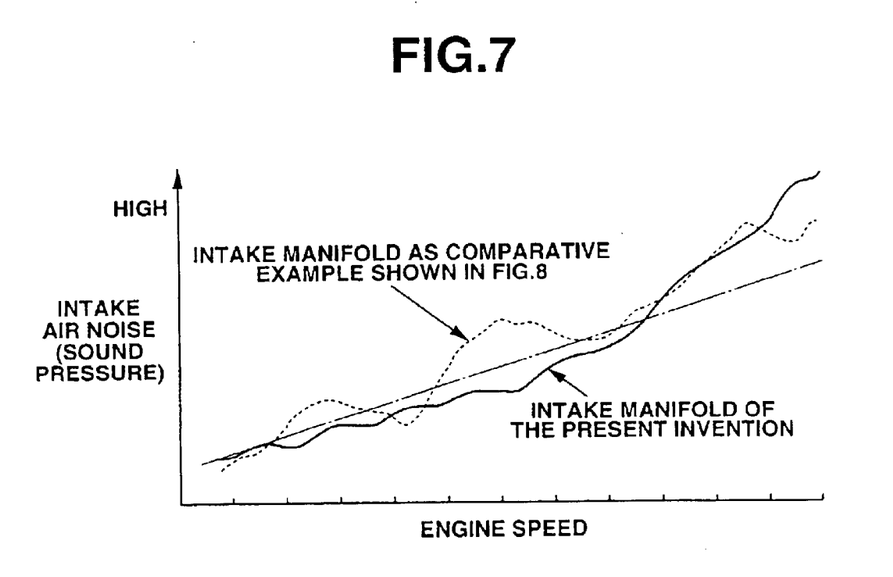
FIG. 7 is a graph showing the air intake characteristics of the intake air structure of FIG. 1 and the air intake characteristics of a related art intake manifold A as a comparative example shown in FIG. 8, in terms of intake air noise and engine speed.

Furthermore, differences in the substantial lengths of the intake air passages for the respective cylinders are decreased so that the intake air noise (or sound pressure) generated by differences in the lengths of the intake air passages for the respective cylinders can be effectively decreased as shown in FIG. 7. Additionally, in intake manifold 1 of this embodiment, the sound pressure increases as an engine speed of an engine rises, so that a driver does not receive uncomfortable feeling. In FIG. 7, a solid line indicates measurement result of the intake air noise of the intake manifold of this embodiment, and a dotted line indicates measurement result of another intake manifold A which is a comparative example as shown in FIG. 8 which will be discussed after.

Here, intake manifold A is different from above-described intake manifold 1 of this embodiment only in location at which the connecting section of intake air inducting pipe 13 is connected to intake air collector 11. As shown in FIG. 8, intake manifold A has a common or usual configuration in which intake air inducting pipe 13 is connected to one end section of intake air collector 11, and each branch pipe 10a to 10d is connected to one side surface of intake air collector 11. Therefore, in this intake manifold A, the substantial lengths of the intake air passages for respective cylinders are not equal, and the peak values of pressure waves generated by the cylinders are not equal to each other as shown in FIGS. 9A and 9B. Furthermore, in intake manifold A, sound pressure varies with the engine speed as apparent from FIG. 7 so that the driver may receive uncomfortable feeling.

Figure 10:
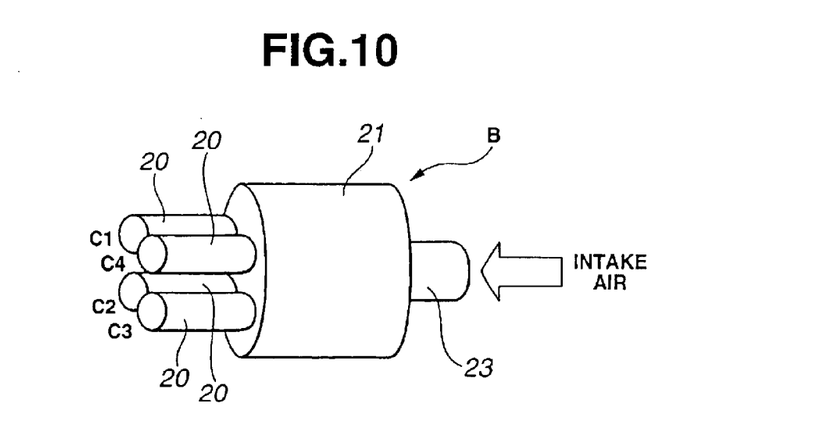
FIG. 10 is an explanatory view of another related art intake manifold B as a comparative example.

In intake manifold B as shown in FIG. 10 in which each branch pipe 20 is three-dimensionally independent, generally the same substantial length or distance from the opening section of the branch pipe 20 to the opening section of intake air inducting pipe 23 is obtained for the respective branch pipes 20. Therefore, it is possible to make the substantial lengths of the intake air passages for the respective cylinders generally equal as shown in FIG. 11A. Furthermore, it is possible to make pressure wave generated from each cylinder uniform as shown in FIG. 11B. However, in such an intake manifold, a configuration becomes complicated, thereby raising problems such as limitation in manufacturing method (molding is impossible), lowering in productivity, increase in a production cost and increase in weight. Additionally, intake manifold B constructed of intake air inducting pipe 23, intake air collector 21 and each branch pipe 20 becomes larger in size there by causing deterioration in mount ability to a vehicle or the like.

Figure 8:
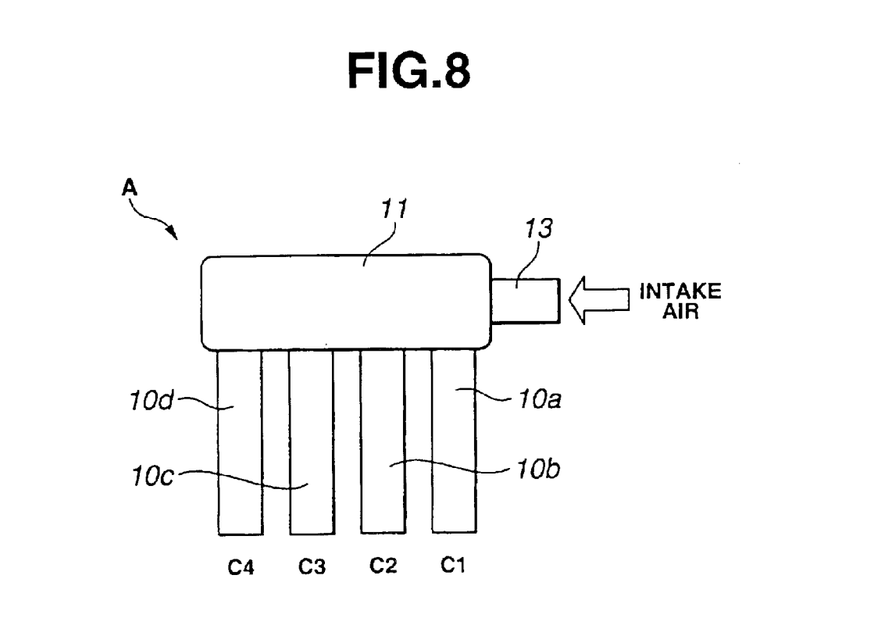
FIG. 8 is an explanatory view of the intake manifold A as the comparative example.
Figure 9A:
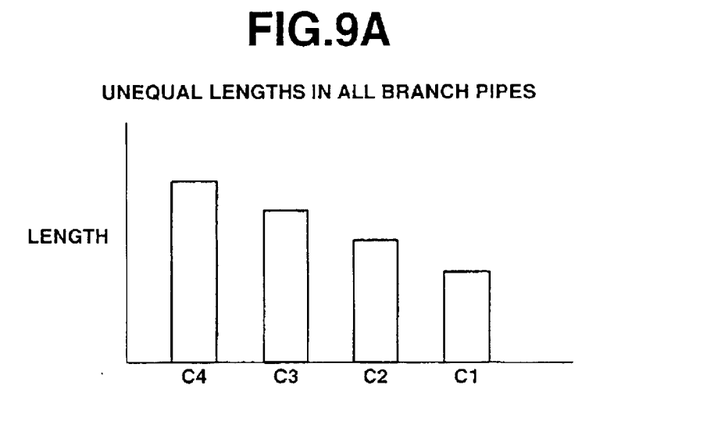
FIG. 9A is a graph showing a structural feature of the intake manifold A of FIG. 8, in terms of length in air intake passage.
Figure 9B:
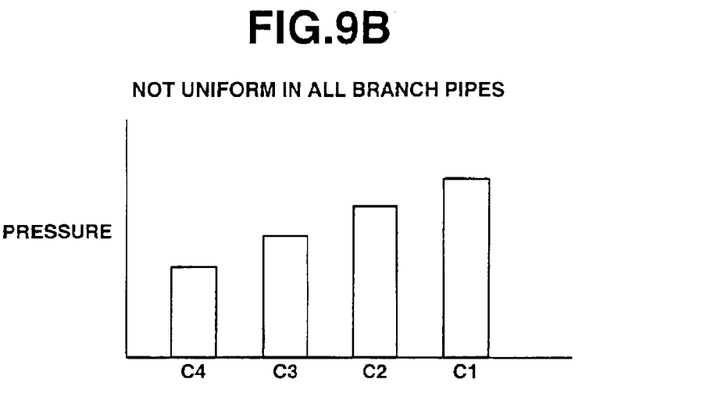
FIG. 9B is a graph showing an effect of the intake manifold A of FIG. 8, in terms of pressure of air.

In contrast to intake manifold B, according to the present invention, it is possible to arrange all branch pipes 4a to 4d in a row along the longitudinal direction of intake air collector 2, so that, it is possible to manufacture intake manifold 1 by using a manufacturing method that is the same as that for intake manifold A as shown in FIG. 8 and different to that for intake manifold B as shown in FIG. 10, i.e., by using molding. Therefore, productivity of the intake manifold is not sacrificed.

Figure 12:
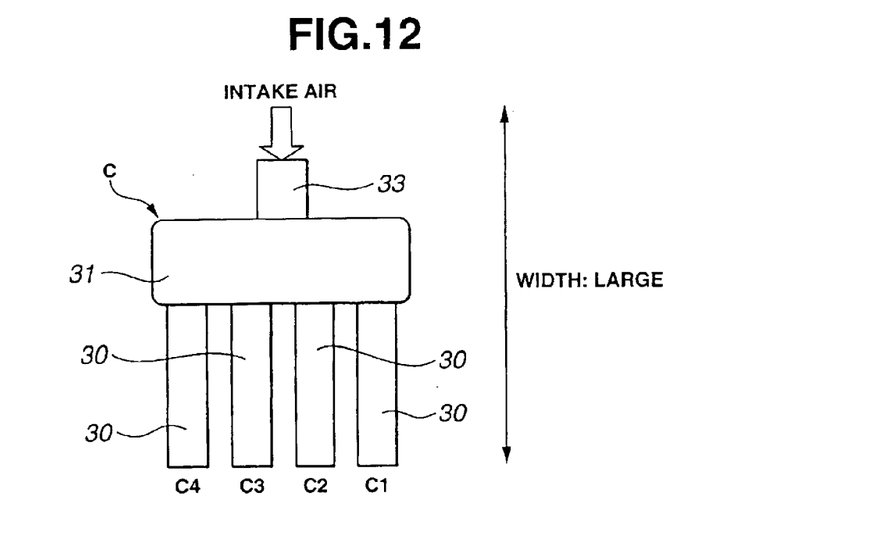
FIG. 12 is an explanatory view of a further related art intake manifold C as a comparative example.
Figure 13A:
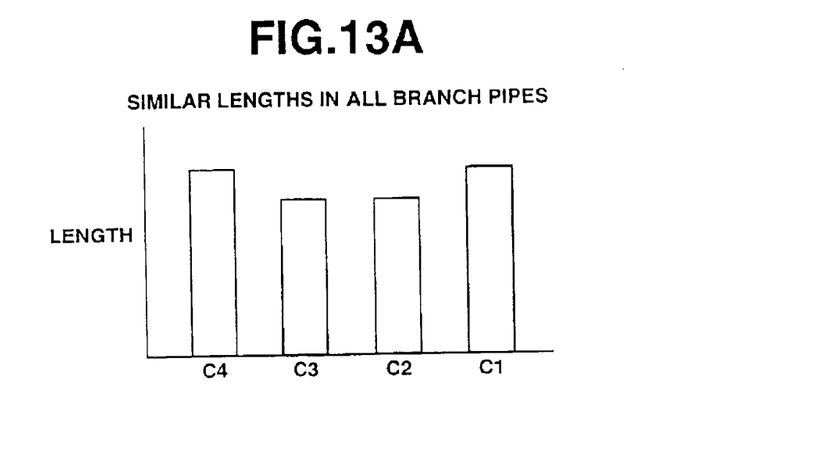
FIG. 13A is a graph showing a structural feature of the intake manifold A of FIG. 12, in terms of length in air intake passage.
Figure 13B:
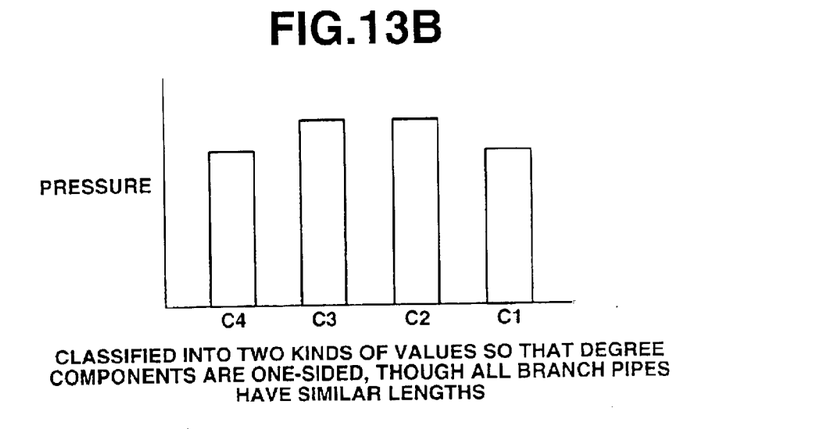
FIG. 13B is a graph showing an effect of the intake manifold A of FIG. 12, in terms of pressure of air.

In intake manifold C as shown in FIG. 12, intake air inducting pipe 33 is connected to intake air collector 31 near the center of the longitudinal direction of intake air collector 31. Each branch pipe 30 is connected to a surface that is opposite to a surface at which intake air inducting pipe 33 is connected. In this case, it is possible to decrease the differences in substantial length of the intake air passages among respective branch pipes (whose lengths are approximately the same) as shown in FIG. 13A. However, a width (dimension in vertical direction in FIG. 12) of intake manifold C including intake air inducting pipe 33, intake air collector 31 and branch pipes 30 becomes relatively large, thereby causing degradation of the mount ability to the vehicle or the like. Additionally, the peak values of pressure waves generated by the cylinders are classified into two values as shown in FIG. 13B, so that the tone of intake air noise dulls. Therefore, it is impossible to make the intake air noise clear as same as noise generated by intake manifold 1 of this embodiment.

In contrast to intake manifold C as shown in FIG. 12, according to the present invention, it is not necessary to make the width of intake manifold 1 large, so that mount ability to the vehicle is not also sacrificed.

Figure 14:
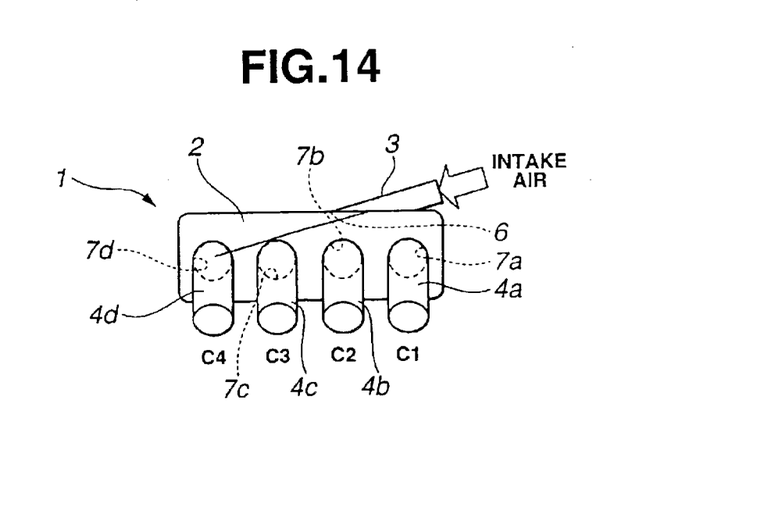
FIG. 14 is an explanatory view of another embodiment of the air intake structure according to the present invention.

Further, the intake air structure of this invention is not limited to the above-discussed embodiment. Accordingly, the axis of intake air inducting pipe opening section 6 located at one end side of the intake air collector is directed to the junction between the intake air collector and the branch pipe connected to the intake air collector and located the farthest from the one end side of the intake air collector, and the intake air inducting pipe opening section is located between opening section 7a of first branch pipe 4a placed the nearest to the one end side of the intake air collector and opening section 7b of second branch pipe 4b placed adjacent to the first branch pipe 4a in the longitudinal direction of the intake air collector. Therefore, intake air inducting pipe 3 may be connected with intake air collector 2 from the above side of intake manifold 1 in a vertical direction in FIG. 1 to FIG. 3, as illustrated in FIG. 14 showing the air intake structure as another embodiment of the present invention. That is to say, it is possible to connect intake air inducting pipe 3 with intake air collector 2 from the vertical direction or a horizontal direction in FIG. 1 to FIG. 3.

Furthermore, the principle of the air intake structure according to this invention is applicable not only to the inline four-cylinder engine but also to engines each of which includes at least one group of the cylinders in which intake manifold is provided for each group of cylinders. More specifically, it is applicable to a first engine having the number (multiple of 4) of cylinders (eight cylinders, twelve cylinders and the like) in which one intake manifold is provided for four cylinders, a second engine having the number (multiple of 3) of cylinders (three cylinders, six cylinders, nine cylinders and the like) in which one intake manifold is provided for three cylinders, and a third engine having the number (multiple of 5) of cylinders (five cylinders, ten cylinders and the like) in which one intake manifold is provided for five cylinders.

In this case, the second and third engines have a little effect for decreasing intake air noise as composed with the first engine. However, these engines can obtain good effects for decreasing intake air noise as compared with engine provided with the above-mentioned intake manifold A.

Additionally, in the above-mentioned embodiment, the axis of intake air inducting pipe opening section 6 located at one end side of the intake air collector is directed to the junction between the branch pipe connected to the intake air collector and the intake air collector located the farthest from the one end side of the intake air collector, and is located between opening section 7a of first branch pipe 4a placed the nearest to the one end section of the intake air collector and opening section 7b of second branch pipe 4b placed adjacent to the first branch pipe in the longitudinal direction of the intake air collector. However, in an inline engine having four or more cylinders (for example, six cylinders or eight cylinders), the intake air inducting pipe opening section may be formed such that its axis is directed to the branch pipe (for example, branch pipe 4c placed secondly nearest to the other end side of the intake air collector) placed at the other end side of the longitudinal direction of the intake air collector in the longitudinal direction, and to be placed between the one branch pipe placed in the one end side of the intake air collector and the next branch pipe placed adjacent to the one branch pipe (for example, between branch pipe 4b placed secondly nearest to the one end side and branch pipe 4c placed thirdly nearest to the one end side of the intake air collector) in the longitudinal direction of the intake air collector.

Hereinafter, technical ideas according to the present invention will be summarized with effects obtained thereby.

(1) The air intake structure of an internal combustion engine, includes an intake air collector having first and second end sides which are longitudinally opposite to each other. An intake air inducting pipe is connected to the intake air collector. A plurality of branch pipes are connected to the intake air collector and communicated respectively with intake air entrances of cylinders of the engine. Each branch pipe is connected through a junction section of the branch pipe to the intake air collector. The junction sections of the branch pipes are arranged or aligned along a longitudinal direction of the intake air collector. In this arrangement, the intake air inducting pipe having an opening section serving as the junction section. The opening section is located between a first branch pipe located at the first end side of the intake air inducting pipe and a second branch pipe located adjacent to the first branch pipe in a longitudinal direction of the intake air collector, and having an axis which is directed to a third branch pipe located at the second end side of the intake air collector.

With this air intake structure, the substantial length of the intake air passage is not equal among respective cylinders; however, the pressure wave of the intake air generated from each cylinder can become similar to the pressure wave of the intake air generated from each cylinder in a case that the substantial length of the intake air passage is equal among respective cylinders. Therefore, it is possible to obtain the same advantage with such a case. In other words, by virtue of the air intake structure of the present invention, the differences in substantial length of the intake air passages for respective cylinders are reduced. Additionally, an air flow friction generated owing to curve of intake air increases as the branch pipe becomes closer to the intake air inducting pipe opening section. Thus, according to the present invention, although the substantial lengths of the intake air passages are not equal among the intake air passages for the respective cylinders, pressure wave of intake air generated from each cylinder can become similar to the pressure wave of the intake air generated from each cylinder in a case that the substantial length of the intake air passage is equal for each cylinder.

(2) In the air intake structure described in (1), the cylinders of the engine include at least one group of cylinders, wherein the intake manifold includes the intake air collector provided for each group of cylinders, the branch pipes of a number corresponding to a number of cylinders in each group of cylinders, and the intake air inducting pipe.

(3) In the air intake structure described in (2), more specifically, each group of cylinders includes four cylinders.

(4) In the air intake structure described in (2), more specifically, each group of cylinders includes three cylinders.

The entire contents of Japanese Patent Application No. P2003-351583, filed Oct. 10, 2003, are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An air intake structure of an internal combustion engine, comprising:

an intake air collector having first and second end sides which are longitudinally opposite to each other;

an intake air inducting pipe connected to the intake air collector; and a plurality of branch pipes connected to the intake air collector and communicated respectively with intake air entrances of cylinders of the engine, each branch pipe being connected through a junction section of the branch pipe to the intake air collector, the junction sections of the branch pipes being arranged along a longitudinal direction of the intake air collector, wherein the intake air inducting pipe having an opening section serving as the junction section, the opening section being located between a first branch pipe located at the first end side of the intake air collector and a second branch pipe located adjacent to the first branch pipe in a longitudinal direction of the intake air collector, and having an axis which is directed to a third branch pipe located at the second end side of the intake air collector.

2. An air intake structure as claimed in claim 1, wherein the intake air collector, the intake air inducting pipe and the branch pipes constitute an intake manifold.

3. An air intake structure as claimed in claim 2, wherein the cylinders of the engine include at least one group of cylinders, wherein the intake manifold includes the intake air collector provided for each group of cylinders, the branch pipes of a number corresponding to a number of cylinders in each group of cylinders, and the intake air inducting pipe.

4. An air intake structure as claimed in claim 3, wherein each group of cylinders includes four cylinders.

5. An air intake structure as claimed in claim 3, wherein each group of cylinders includes three cylinders.

* * * * *